United States Patent
Jodlauk et al.

(10) Patent No.: US 9,867,018 B2
(45) Date of Patent: Jan. 9, 2018

(54) LOCALIZED NETWORK SERVICE

(71) Applicant: Telefonaktiebolaget LM Ericsson (publ), Stockholm (SE)

(72) Inventors: Gordian Jodlauk, Würselen (DE); Branko Djordjevic, Herzogenrath (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 87 days.

(21) Appl. No.: 15/161,866

(22) Filed: May 23, 2016

(65) Prior Publication Data

US 2016/0269874 A1    Sep. 15, 2016

Related U.S. Application Data

(63) Continuation of application No. 14/652,990, filed as application No. PCT/EP2012/076128 on Dec. 19, 2012, now Pat. No. 9,380,427.

(51) Int. Cl.
*H04M 3/42* (2006.01)
*H04W 4/06* (2009.01)
(Continued)

(52) U.S. Cl.
CPC .......... *H04W 4/06* (2013.01); *H04L 12/1845* (2013.01); *H04L 43/16* (2013.01); *H04W 4/021* (2013.01);
(Continued)

(58) Field of Classification Search
CPC ............... H04W 88/02; H04W 72/042; H04W 72/0413; H04W 72/0453; H04W 72/12;
(Continued)

(56) References Cited

U.S. PATENT DOCUMENTS 6,389,289 B1 *  5/2002  Voce ................. H04B 7/18547
                                                              455/429
2009/0243925 A1  10/2009  Kellermeier et al.
(Continued)

FOREIGN PATENT DOCUMENTS

WO    WO 2012/055433 A1    5/2012

OTHER PUBLICATIONS

International Search Report, International Application No. PCT/EP2012/076128, dated Sep. 25, 2013.
(Continued)

*Primary Examiner* — Kwasi Karikari
(74) *Attorney, Agent, or Firm* — Sage Patent Group

(57) ABSTRACT

A method for providing a network service to a plurality of mobile terminals inside a service area, the mobile terminals being arranged to communicate with a cellular communication network and the service area being a part of a geographical area that is covered by the cellular communication network, the method comprising the steps of defining a grid with grid lines, the grid covering the service area with one or more tiles framed by the grid lines; determining whether there is at least one split tile that results from splitting the one or more tiles along closer grid lines and that does not overlap with the service area; splitting the one or more tiles along the closer grid lines based on the determining; and providing the network service in the split tiles that cover the service area.

20 Claims, 5 Drawing Sheets

(51) Int. Cl.
| | |
|---|---|
| *H04W 4/02* | (2009.01) |
| *H04W 16/24* | (2009.01) |
| *H04W 48/16* | (2009.01) |
| *H04L 12/18* | (2006.01) |
| *H04L 12/26* | (2006.01) |
| *H04W 72/04* | (2009.01) |
| *H04W 84/18* | (2009.01) |

(52) U.S. Cl.
CPC ........... *H04W 4/023* (2013.01); *H04W 16/24* (2013.01); *H04W 48/16* (2013.01); *H04W 72/0446* (2013.01); *H04L 12/189* (2013.01); *H04W 84/18* (2013.01)

(58) Field of Classification Search
CPC ... H04W 36/04; H04W 72/046; H04W 16/04; H04W 16/08; H04W 16/12; H04W 28/0205; H04L 5/0048; H04L 5/001; H04L 5/0073
USPC ...................................... 455/414.2
See application file for complete search history.

(56) References Cited

U.S. PATENT DOCUMENTS

2013/0130683 A1   5/2013   Krukar
2013/0217419 A1   8/2013   Jodlauk et al.

OTHER PUBLICATIONS

ETSI, TS 103 084 V<0.0.2> (<Jun. 2012>) "Geomessaging Enabler", ETSI Draft; WG10025V002, European Telecommunications Standards Institute (ETSI), 650, Route Des Lucioles, F-06921 Sophia-Antipolis; France; No. V0.0.2, Jun. 20, 2012, XP014073029A, 35 pages.

Jöchle et al., "Efficiency Analysis of Geocast Target Region Specifications for VANET Applications", *2012 IEEE Vehicular Network Conference (VNC)*, Nov. 14, 2014, pp. 250-257.

Jodlauk et al., "An Optimized Grid-Based Geocasting Method for Cellular Mobile Networks", *Proc. 18th ITS World Congress*, Orlando, Florida, Oct. 16-20, 2011, 12 pages.

* cited by examiner

LOCALIZED NETWORK SERVICE

CROSS REFERENCE TO RELATED APPLICATIONS

This application is a continuation of U.S. patent application Ser. No. 14/652,990, filed 17 Jun. 2015, which itself is a 35 U.S.C. §371 national stage application of PCT International Application No. PCT/EP2012/076128, filed on 19 Dec. 2012, the disclosure and content of which is incorporated by reference herein in its entirety. The above-referenced PCT International Application was published in the English language as International Publication No. WO 2014/094843 A1 on 26 Jun. 2014.

TECHNICAL FIELD

The present invention relates to providing a network service to a plurality of mobile terminals that are arranged to communicate with a cellular communication network. The present invention specifically relates to providing a network service in tiles of a grid that cover a service area in which said network service is to be provided. The present invention also relates to a corresponding network entity, a corresponding network system, a corresponding computer program, and a corresponding computer program product.

BACKGROUND

It is known to provide so-called Location Based Services (LBS) in cellular communication networks, such as a cellular wireless telephone network. Such services typically comprise a mechanism for estimating the location of a mobile terminal, e.g. with the help of satellite-based positioning systems (GPS, Galileo, Glonass, etc.) and/or a Mobile Positioning System (MPS). Said LBS mechanisms are known to enable content delivery based on the location of a user or a vehicle (mobile terminal). Based on the knowledge of the mobile terminal's location, specific location based services can be offered to said mobile terminal, e.g. alert messages for upcoming road traffic hazards or indications toward deviations to avoid traffic jams. In these examples the user is a vehicle with a respective mobile terminal on board.

It is further known to broadcast information with the help of so-called Cell Broadcast Services (CBS), in order to distribute information to mobile terminals within one or more cells. The respective mobile terminals have to enable the listening of the respective broadcast channel. A so-called Multimedia Broadcast and Multicast Service (MBMS) is known that provides a broadband broadcast to mobile terminals.

Such data communication in cellular communication networks is dominated by using a request response communication mechanism that is triggered by the mobile terminal, or point-to-point (P2P) data communication using Short Message Service (SMS) and Multimedia Message Service (MMS). Further, said LBS technologies or the aforementioned broadcast technologies are being introduced for enabling an enriched request response communication.

One possible implementation of an LBS uses a grid formed by crossing grid lines so as to define grid fields, or tiles, that are framed by the grid lines. Usually, four grid lines form at least one tile of a square-like, rectangular, or any 4-polygon-like shape. The grid, the grid lines, and the tiles can be defined so as to cover a given service area with one or more tiles. Said service area may consist of one or more contiguous areas of arbitrary shape in which said network service is to be provided. An example can be a circular service area covering a road intersection. In general, the service area is independent from the grid, the grid lines, and thus also from the tiles.

Such network services may involve information indicting the position and the extension of the grid lines, crossing information indicating that a mobile terminal has crossed a grid line, i.e. indicating that the mobile terminal has entered a specific tile, and tile information for keeping track of what mobile terminals are currently inside a given tile. Said information concerning the grid lines may be conveyed to the mobile terminals so that a crossing of one grid line can be detected by the mobile terminal. Such crossing may trigger the generating and sending to the network side (e.g. a responsible target network entity) of said crossing information. Correspondingly the network side can keep track of what mobile terminal(s) are in what tile for maintaining said tile information.

When the network service is to send any information (e.g. a message, such as a traffic hazard warning) to some or all mobile terminals that are currently inside a given service area, it can be referred to the tile information so as to determine all the mobile terminals that are inside the tiles that cover the specific service area. Referring to said tile information can also yield an identification of all the target mobile terminals. Thus, messages can be then sent only to these target mobile terminals ensuring that the right terminals are addressed, e.g. the ones that may be affected by a warning, and that—at the same time—unnecessary communication to mobile terminals outside the service area is avoided.

Such conventional concepts usually deploy tiles with a fixed size so that a constant number of tiles cover a given service area. A corresponding exemplary situation is shown in conjunction with FIG. 2A, in which the four tiles 101, 102, 103, and 104, formed by crossing grid lines 1101 to 1105, cover an exemplary service area 200. In such situations, the tiles are assumed to be constant and to not to take into account any detailed relation between the service area and the actual tiles. For example, the tile 104 of FIG. 2A overlaps with the service area 200 only by a small fraction.

In any way, the actual tile size may have significant impacts on signalling capacity and/or messaging overhead. As a consequence, the overall bandwidth required by the network service may depend on the tile size. For example, messages may be sent to all terminals inside tile 104 although most of the terminals that are located inside tile 104 may not be inside the service area 200.

Therefore, there is a need for a method of providing a network service, and corresponding network entities, network systems, computer programs, and computer program products that take into account the dependence of the required bandwidth of the network service (i.e. radio and processing resources) on actual tile size. Such a solution is desirable, since less bandwidth may be needed, resulting in—amongst others—a saving in the total cost of ownership.

SUMMARY

The above-mentioned problems and drawbacks of the conventional concepts are solved by the subject-matter of the independent claims. Further preferred embodiments are defined in the dependent claims.

According to an aspect of the present invention, a method is provided for providing a network service to a plurality of mobile terminals inside a service area, the mobile terminals being arranged to communicate with a cellular communication network and the service area being a part of a geographical area that is covered by the cellular communication network. The method comprises the steps of defining a grid with grid lines, the grid covering the service area with one or more tiles framed by the grid lines; determining whether there is at least one split tile that results from splitting the one or more tiles along closer grid lines and that does not overlap with the service area; splitting the one or more tiles along the closer grid lines based on the determining; and providing the network service in the split tiles that cover the service area.

According to another aspect of the present invention, a network entity is provided for providing a network service to a plurality of mobile terminals inside a service area, the mobile terminals being arranged to communicate with a cellular communication network and the service area being a part of a geographical area that is covered by the cellular communication network. The network entity comprises a processing unit that is configured to define a grid with grid lines, the grid covering the service area with one or more tiles framed by the grid lines; determine whether there is at least one split tile that results from splitting the one or more tiles along closer grid lines and that does not overlap with the service area; split the one or more tiles along the closer grid lines based on the determination whether there is at least one split tile; and to provide the network service in the split tiles that cover the service area.

According to another aspect of the present invention, a network system is provided in which a network service is provided to a plurality of mobile terminals, wherein the network system comprises a network entity of one of the embodiments of the present invention.

According to another aspect of the present invention, a computer program is provided that comprises code, the code, when executed on a processing unit, instructing the processing unit to perform a method embodiment of the present invention.

According to yet another aspect of the present invention, a computer program product is provided that stores code, the code, when executed on a processing unit, instructing the processing unit to perform a method embodiment of the present invention.

BRIEF DESCRIPTION OF THE DRAWINGS

Embodiments of the present invention, which are presented for better understanding the inventive concepts but which are not to be seen as limiting the invention, will now be described with reference to the Figures in which.

DETAILED DESCRIPTION

Figure 1A:
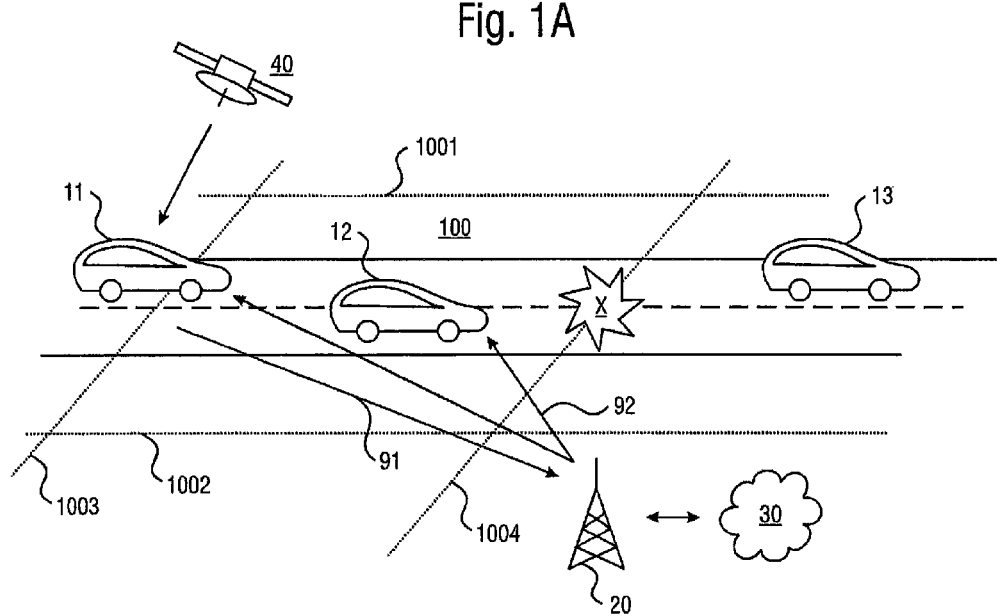
FIG. 1A shows a schematic representation of an in-field implementation of a network service according to an embodiment of the present invention.

Firstly, the basic concept of a localized network service (LBS) is described with the example of travelling vehicles as shown with FIG. 1A. In this example, vehicles 11, 12, and 13 travel along a road, such as a multi-lane highway. The vehicles may have access to a satellite-supported positioning service 40, such as the ones known by Global Positioning System (GPS), Galileo, Glonass, or other services that allow for a determination of a terminal's geographical position. Access to this service 40 may require equipment on each vehicle 11, 12, and 13, adapted to receive signals from one or more satellites and to compute information that indicates a geographical position from the received signals. The network service may involve defining a grid with grid lines 1001, 1002, 1003, and 1004, the grid covering a service area in which the network service is provided to the mobile terminals. The grid comprises tiles, such as tile 100, formed by respectively crossing grid lines.

As shown, vehicle 11 is about to cross grid line 1003. Vehicle 11 determines such a crossing based on position information retrieved from the positioning service 40 and the knowledge of the position and extension of grid line 1003. This may trigger crossing information to be generated and sent via a related notification 91 (message) via a radio base station 20 to the network side 30. The network side may thus be aware of vehicle 11 having just entered tile 100.

It is, therefore, able to maintain tile information for at least tile 100, the information comprising identification information of the one or more terminals (here the terminals on vehicles 11 and 12), when inside tile 100. In general, the terms vehicle, user, and mobile terminal are used synonymously, since a user may possess a mobile terminal, and a mobile terminal may be on board of a vehicle operated by the user, so that in the context of the present invention the geographical position of all the vehicle, the user, and the mobile terminal usually coincide.

Once the network service is about to send a payload message to target mobile terminals it can thus refer to the tile information for determining all target terminals. In this way, a payload message 92 can be specifically sent to vehicles 11 and 12, whereas no communication needs to be performed with vehicle 12. An example may be the notification of slippery road conditions inside tile 100, or, generally, any hazard X in front of vehicles 11 and 12. Since vehicle 13 has already passed by hazard X and is outside tile 100, no message 92 is sent to this vehicle. In this way, not only bandwidth is saved, but also the driver of vehicle 13 is not distracted by receiving a message 92 that is actually of no interest. In any way, the above concept makes sure that all mobile terminals for which the respective payload message is of interest receive the respective notification 92, whereas other terminals are not disturbed/distracted by information that is not relevant to them.

Figure 1B:
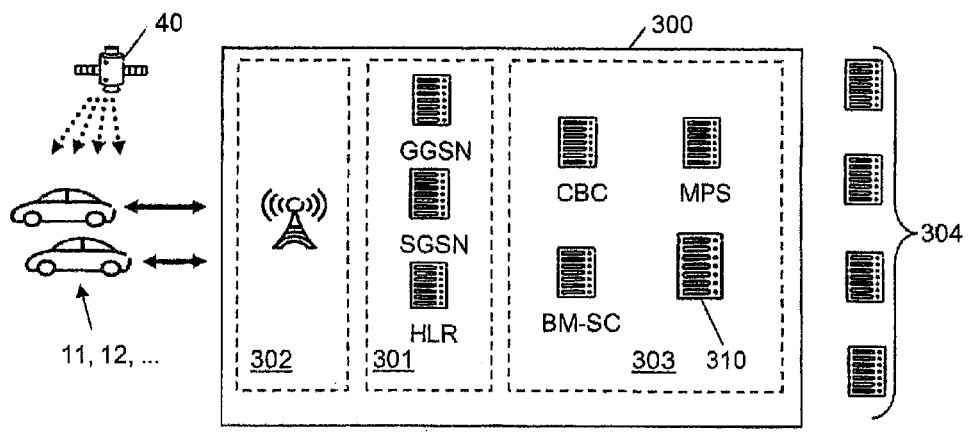
FIG. 1B shows a schematic view of a network system architecture according to another embodiment of the present invention.

FIG. 1B shows a schematic view of a network system architecture according to another embodiment of the present invention. Specifically, the network service can be deployed in an operator's network system as exemplified in this FIG. 2 that depicts, as an exemplary deployment, an overview in an UMTS environment. Besides the cellular network's core 301 and RAN (radio access network) 302 it shows that part of the network service are provided by a network entity 310 that will be described in greater detail in conjunction with the respective embodiments. Also, other subsystems and nodes 303 in the operator's network may be involved, wherein these other subsystems and nodes 303 may include a Cell Broadcast Center (CBC), a Mobile Positioning System (MPS), and/or a Broadcast Multicast Service Center (BM-SC). Said core 301 may comprise Gateway GPRS Support Node (GCSN), a Serving GPRS Support Node (SGSN), and/or a Home Location Register (HLR).

For providing the network service further service entities 304 can be employed that send so-called GeoCast messages (GeoMessaging) to the system and with it to the vehicles 11, 12, etc. On the other hand, the vehicles may send their uplink messages directly to the service, and, additionally, the vehicles keep their location in synchronization with a grid database via sending the above-mentioned crossing information. The services 304 can be internal, i.e. part of the operator's network or respective domain, so as to provide any payload destined for any service area via employing the network entity 310.

Furthermore, the shown architecture also allows for the services 304 being external in the sense of not belonging to the operator's domain. In this way, the services 304 can be operated independently by external operators that do not have access to the tile information which can be maintained internally, for example, in conjunction with the network entity 310. As a consequence, the sensitive information on who is where (i.e. what mobile terminals are in what tile) does not need to leave the network operator's domain. At the same time, however, the external services 304 provide the network service via registering to the operator's network and, for example, providing some payload destined for a given service area. The actual forwarding of this payload to the mobile terminals in this service area is then effected internally by entity 310, without the tile information being accessible to the services 304.

In general, the vehicle density in a given area is assumed to have no impact on the grid spacing but only on the capacity the network needs to provide (bandwidth and radio, communication, and processing resources). Embodiments of the present invention envisage monitoring the mapping of the service areas to grid tiles, and, for example, if the ratio between an area mapped by the tiles and the service area, a split of the tile(s) along closer grid lines is considered. In turn any split tiles are aging and if no similar split decision would have been taken within a timeout period (e.g. 1 hour), then the tiles are joined again. By this method the granularity of the grid, and there with the network load for localization, stays optimized to the current (GeoMessaging) usage pattern.

The above split procedure can be handled deferred or immediately. For the immediate split, all vehicles in a tile are informed immediately by a grid spacing update message about the split. Said grid spacing update message may be some form of the above-mentioned information indicting the position and the extension of the grid lines, now, however, related to closer grid lines. Thus, the vehicles will send their location update accordingly. In the deferred case, no extra grid spacing update messages are sent and only vehicles newly entering the "old" tile will know about the denser grid spacing. At this time, the information indicting the position and the extension of the closer grid lines is conveyed to these vehicles. The deferred approach will result in a smooth transition of the grid spacing without generating a peak in the network load. For a join of tiles the deferred method is the most meaningful.

Figure 2A:
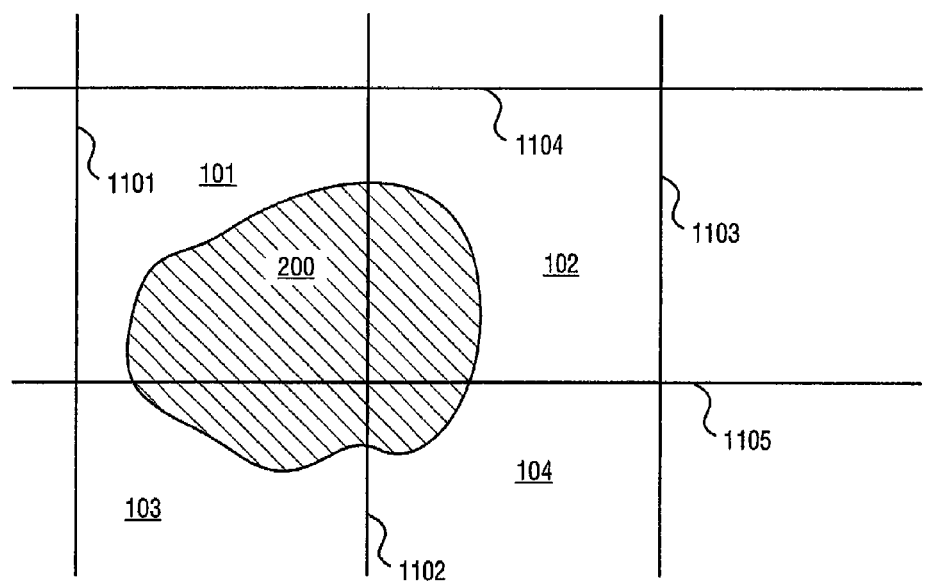
FIGS. 2A to 2C show in a schematic fashion the splitting of tiles in line with embodiments of the present invention.
Figure 2B:
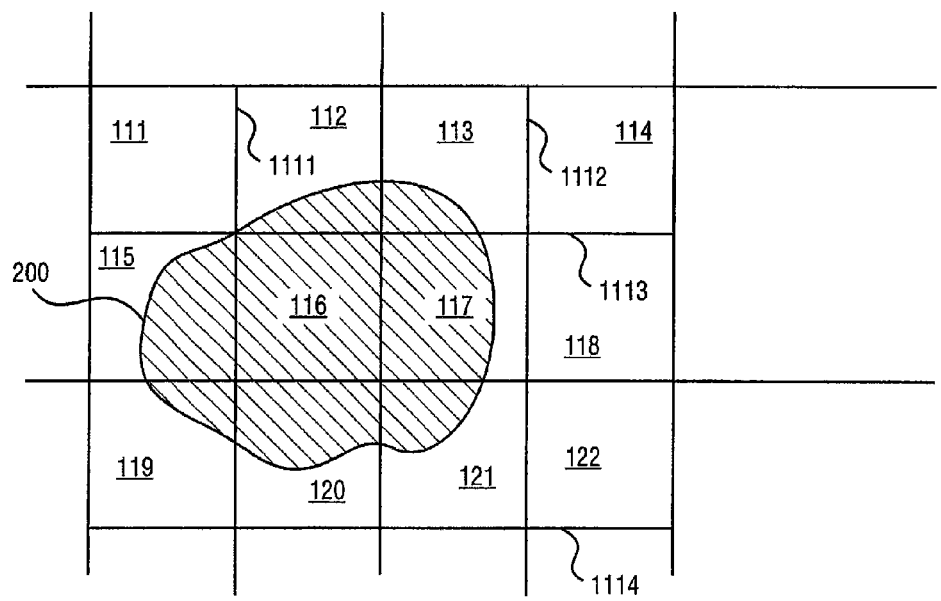
Figure 2C:
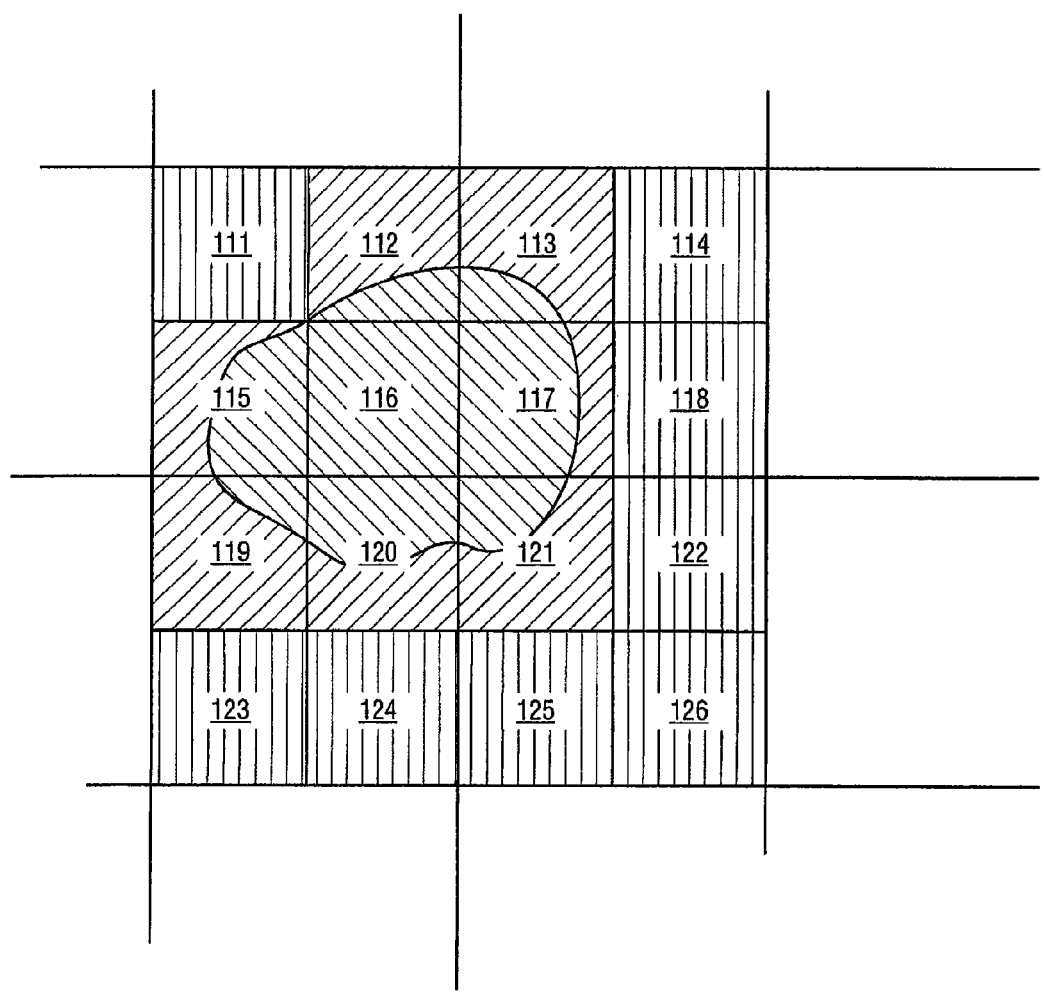

FIGS. 2A to 2C show in a schematic fashion the splitting of tiles in line with embodiments of the present invention.

The conventional situation as shown in conjunction with FIG. 2A is a possible starting point of the embodiments of the present invention. Specifically, the tiles 101, 102, 103, and 104 result from crossing grid lines 1101, 1102, 1103, 1104, and 1105. The service area 200 is covered by tiles 101 to 104. FIG. 2B shows the situation after splitting the tiles along the closer grid lines 1111, 1112, 1113, and 1114, so as to produce split tiles 111 to 122. As becomes apparent from FIG. 2C, split tiles 112, 113, 115, 116, 117, 119, 120, and 121 suffice to cover the service area 200. In a way, the split resulted in a more efficient mapping of the service area 200 to the tiles of the grid.

In general, reducing tile size will reduce the amount of user plane messages (payload), since all the vehicles or terminals that are inside the remaining split tiles 111, 114, 118, 122, and 123 to 126, need not to be provided with the payload. However, reducing the tile size may also provoke a signalling increase with the possible constraint of the radio infrastructure capacity for the tile. Involved parameters also include the number of clients in the tile, payload message size (from few bytes to several kilobytes) and payload message frequency. For example, if the payload is tiny (only some tens of bytes), but the signalling involved with a grid spacing update is comparatively large (some KB), the effectiveness of the split may need to be considered. Further, frequent small messages may not be as problematic as frequent large messages.

In this context, estimates regarding the savings on the payload side can be carried out based on the single client. More clients in the tile will then have an impact on the saving as a relative saving that stays constant and as an absolute saving that increases linearly with vehicles' density. Therefore, the precision estimate may be higher for a higher vehicle density.

The above split procedure is now described in the exemplary case of a C-ITS Application Server (C-ITS AS) that knows the so-called Service Area (SA) and a GeoMessaging Enabler that knows tiles. C-ITS is an acronym for Cooperative Intelligent Transport Systems whose applications cover a wide range of different scenarios for road transport with entities in the infrastructure, in vehicles, and in portable devices. The related functional communication involves a variety of communication technologies, such as ad-hoc communications (e.g. ITS-G5 standardized at ETSI, equivalent to CALM M5 standardized at ISO), infra-red (IR) standardized at ISO and others such as millimeter radio waves, cellular network communications (e.g. UMTS, LTE and other generations). A GeoMessaging Enabler is for example the Geolocation Messaging (TM) system of Ericsson Inc.

Both the C-ITS AS SA and the GeoMessaging Enabler tiles are equivalent, respectively, to the service area and tiles of the other embodiments of the present invention. Depending on the specific C-ITS AS configuration, the service area can be defined in terms of a static, fixed shape, or dynamic, i.e. it changes shape and/or position in the next message. As far as the split factor is concerned, a factor of 2 (i.e. 2 times 2 split tiles) may be preferred. This situation corresponds to the split shown in conjunction with FIGS. 2A and 2B. Nevertheless, also other factors, such as 3, may be employed, but such splitting may become more difficult to handle as the grid gets more and more fragmented.

In general, the saving obtained by a tile split can be large for comparatively small SAs (as compared to the tile size). For permanent or static target areas this may be reasonable, so that the GeoMessaging Enabler shall be informed from the C-ITS AS on whether a service area is static or dynamic.

In the case of static SAs any timers for determining a possible later join should not age fast, since there is no dynamic process that would interfere with the split of tiles.

Furthermore, the C-ITS AS shall register static SAs at the GeoMessaging Enabler and provide information regarding usage pattern, comprising, for example, an average message frequency, message size or payload bandwidth. After registration, an SA can be identified and may be thus addressable by a GUID reference (Globally Unique ID). The C-ITS AS the addresses these target (service) areas by using such GUID. In general, complex shapes of SAs may require more signalling than simpler shapes, in the sense that a for example a rectangular SA can be easier handled along with rectangular tiles.

In the following, a specific calculation on the split benefit is described. It may be employed in embodiments of the present invention, for example, in conjunction with the determination of whether tiles are split or not. Again, the situation as shown in FIG. 2A serves as a starting point in that figure S1 represents the area of service area 200, whereas figure S represents the sum area of tiles 101, 102, 103, and 104 which cover service area, and figure S2 represents the overhead with S2=S−S1.

In FIG. 2B, that depicts situation after the split, the sum area of tiles 112, 113, 115, 116, 117, and 119 to 121 which cover service area can be identified as S'. As is immediately apparent the residual overhead S2'=S'−S1 is substantially less than overhead S2 before the split. The overhead is reduced by the sum area S2S of tiles 111, 114, 118, 122, and 123 to 126 that do not cover the service area 200. This situation is emphasized in conjunction with FIG. 2C in which S' is shown in diagonally hatched fashion and S2S is shown vertically hatched fashion. Tile splitting saving S2S, i.e. the reduction of residual overhead with tile splitting is the difference between S and S', so that S2S=S−S'.

As far as signalling is concerned, it is now considered the number of location (LOC) messages per time unit (second) in one tile. LOC messages will be sent when a vehicle crosses a grid line as the above-mentioned crossing information. For the sake of simplicity, only the vehicles which enter the tile are taken into account. Furthermore, the tile split factor is assumed to be 2 which cuts by half traveling distance to reach the next tile. When traveling at the average speed this split tile doubles the number of the LOC messages. With L being the border line length of the tile, and P being the total border line length of an area, i.e. circumference of a tile or the sum of all Ls.

Therefore, one can define after the split $$L'=0.5*L; \text{ and} \tag{1}$$

$$P'=4*L'=4*0.5*L=2*L; \tag{2}$$

so, the total border line will be 2 times longer after the split, and therewith 2 times more LOC messages will be generates as compared to the original tile. If signalling load (achieved by tile splitting), is larger than the saving in payload (achieved by tile splitting), tile splitting itself may not be sensible. A related process may correspondingly judge not to perform tile splitting.

However, LOC messages can be quite small, e.g. only 100 bytes in some common implementations. At the same time, signalling load can be well estimated if the number of the vehicles in the area is known or can be estimated. Additionally, an average vehicle speed can be considered for statistical purposes and history-based estimations. An absolute maximal value can be derived for the signalling load, if the total number of road lanes entering the tile is known. For a vehicle safety distance (in the time domain) of, for example, 2 seconds, $$\text{LOC\_MAX}=(\text{number of lanes})/2. \tag{3}$$

Assuming a highway intersection being located within the tile, three lanes in each direction will produce a maximum of (4*3)/2=6 LOC/s. This will be a maximum figure in any feasible traffic situation.

On the other hand, signalling payload for such a highway intersection tile can be approximated to be at maximum 600 bytes/s. A more conservative guess will be 1 KB/s (B=byte), in case also a GRID update occurs as well. It is further assumed that there is at maximum one lane crossing per 50 meters of tile border line (in the urban areas with high infrastructure density). The estimation of a maximum signalling involved is carried out for a tile with 1 km border line length, i.e. a tile with an area of 1 km$^2$. With the above density of one lane per 50 meters of the tile border line, on 1 km there is $$\text{LOC\_MAX} = (20 \text{ lanes} * 4 \text{ sides})/2 \tag{4}$$

$$= 40 \ LOC/s.$$

From the above, a maximum bandwidth BW_MAX for signalling within the 1 km$^2$ tile can be estimated to be is 4 KB/s.

On the other hand, the estimation of the maximum signalling in the minimum tile size of 50 meters is LOC_MAX=4/2=2 LOC/s=200 B/s. Even for the instance that such a small tile (50 meters*50 meters) contains a large 3-lane road intersection, estimation of the maximum signalling will be: LOC_MAX=12/2=6 LOC/s=600 B/s.

On the payload saving side, the number of vehicles in the tile can be considered. This may involve keeping statistics per tile within the GeoMessaging Enabler together with the above figure S2S, i.e. any figure indicating how many split tiles can be saved. Specifically, in case three split tiles (out of four) are part of S2S, then a 75% saving is achieved with regard to the addressed terminals as compared to the original tile. In case two split tiles (out of four) are part of S2S, then a 50% saving is achieved with regard to the addressed terminals as compared to the original tile. Finally, in case one split tile (out of four) is part of S2S, only a 25% saving is achieved with regard to the addressed terminals as compared to the original tile. In general, it is assumed that vehicles are distributed equally in the tile.

With the assumption of a statistical distribution of vehicles in one tile, the number of vehicles may correlate to the tile size. This may be, however, valid only for large tiles and not for small tiles. In any way, the statistic precision may be higher for the larger tiles.

In the following, a further example is given that considers a 500 meter grid with a corresponding tile size of 500 m×500 m. A signalling payload for all addressed vehicles in the tile is assumed to be maximum 8 KB/s before tile splitting. After tile splitting, signalling payload is assumed to be 16 KB/s. Further, payload in the tile is assumed to be 24 KB/s.

With a 50% tile saving, i.e. two out of four split tiles are part of S2S, the payload will be 12 KB/s. A total gain with tile splitting in this case will be 12 KB/s−8 KB/s=4 KB/s. In terms of percent, the total saving is 12.5% (4 KB/s/(24 KB/s+8 KB/s)). Assuming a threshold for tile splitting decision to be X % but being lower than 12.5%, the GeoMessaging Enabler will perform tile splitting, whereas for X>12.5, no tile splitting will take place.

Figure 3:
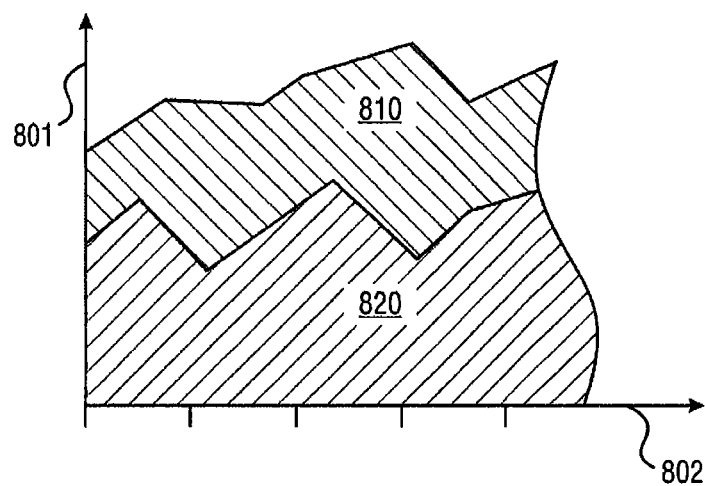
FIG. 3 shows a possible timely evolution of the signalling and payload versus time.

FIG. 3 shows a possible timely evolution of the signalling 820 and the payload 810 in Mbit/minute (axis 801) versus time in minutes (axis 802).

With again reference to FIG. 2C, split tiles can have special designation names, which will reflect the original tile name. For example, tile 101 may have an associated name "T106". Since tile 101 was split into four tiles, the resulting tiles 111, 112, 115, and 116 can be denoted as "T106$a$", "T106$b$", "T106$c$", and "T106$d$". When an aging timer expires, split tiles can be easily recomposed (joined) again to tile 101 with denomination "T106". If tile 112 with denomination "T106$b$" is split too, the four newly split tiles can have a names "T106$ba$", "T106$bb$", "T106$bc$", and "T106$bd$", respectively. Such naming can be applied recursively. Extra tile names can be required for statistical purposes (identifiers). In any way, tiles are already unambiguously defined by their coordinates and size, so that the denomination by dedicated names can be optional.

In the following, dynamic service areas are considered. Specifically, improvements can be obtained in that a dynamic tile size saves on signalling, payload, and load balancing. In such cases, a split decision will be taken every time when a message is coming in. With the improvements on the signalling side one runtime parameter for the split decision may be the current payload. The better the payload's traffic pattern is known, the more precise a decision can be taken.

As already mentioned, embodiments of the present invention may employ a so-called aging timer whose expiry will result in re-joining the previously split tiles. For the case of permanent, static target areas, however, no aging timer may be necessary if there is information at hand on the usage pattern. If no such information is available but if payload traffic statistics are available, a high aging timer value can be used. Again, the better the payload's traffic pattern is known, the more precise a decision on splitting can be taken. In turn, for more precise decisions a longer aging timer value can be used than for less precise decisions. In general, however, registered SAs aging timers should expire if they are not used.

Moreover, criteria such as a minimum tile size and the reduction of the location update frequency may also apply. For example, GPS has an effective precision of 10 meters, so this size will be absolute minimum tile size. Further, with an average speed of 40 km/h, and a tile size of 650 meters, a tile can be traversed by a vehicle within 60 seconds. Therefore, the minimum tile size can be put to 100 meters and in this case a LU (location update) occurs every 10 seconds per vehicle.

By splitting the tile(s), some payload can be saved at the cost of an increased signalling. Both signalling and payload depends of number of vehicles in the tile (service area). A maximum payload is calculated to be 4 KB/s for a 1 km² tile. This figure is being doubled by each split as can be deduced from the calculations above. In addition, there may be the need for statistical purposes to collect maps database, and to conclude when a tile intersects a road lane. Also, there may be a need to perform further statistics, e.g. on the number of LOC messages per second and per tile.

According to a further embodiment, it may be considered how many road lines intersect with an original tile. From the minimum security distance (in the time domain), e.g. 2 seconds, it can be derived that there are at maximum 0.5 LOC messages per second and per lane. If the service area is given an identifier (ID), statistics can be collected per each ID. If an aging timer is required for newly split tiles, such statistic measurement can be of benefit and should be therefore collected.

In general, an involved database should contain/store the following information and corresponding entries: a tile ID, tile coordinates, a tile size, an aging timer, an SA database registry that contains a pre-calculated mapping of SAs to tiles and that are statistically split, an SA aging timer, any SA GUIDs, an average payload (e.g. in Mbit per minute in terms of a sliding window), a tile splitting threshold (e.g. in percent [%]), an old tile ID, a new tile ID, a payload saving per tile split (e.g. in terms of a statistic, which can be only the saving which leads to the split decision), and an residual overhead (should be a property of one SA). In addition, a database history can be kept, e.g. within the GeoMessaging Enabler, for certain period of time. Further, an absolute payload statistics could be kept on a gliding average (e.g. in one minute window).

In the following, aspects of communicating the tile splitting towards the vehicles (mobile terminals) are described. It can be assumed that within one grid 100 to 1000 different service areas can coexist. It may then be important to cross-compare the size of the service area versus the corresponding tile area. If there is a lot of overhead, then a split of the tile (e.g. with factor 2) can be considered to reduce the overhead, wherein such splitting of the tile is not related to the infrastructure or to number of radio channels available. After considering the splitting of the tile, the possible saving is calculated: if the achievable saving is above a predefined threshold, tile split is justified and the splitting of the tile can be actually executed, e.g. within GeoMessaging Enabler. For static SAs, a corresponding split decision can be taken at the time of registration.

Figure 4A:
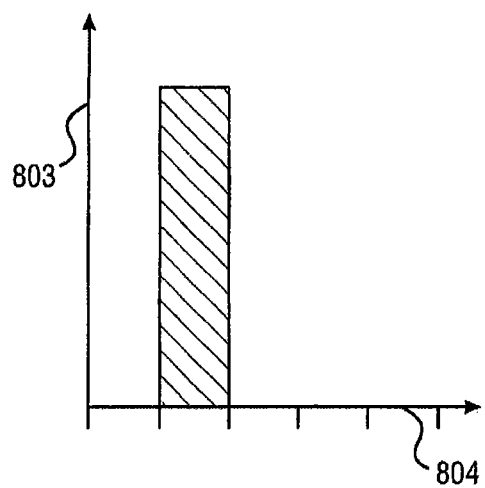
FIGS. 4A and 4B show different broadcast scenarios in terms of broadcast capacity versus time.

If the C-ITS AS provides information on the usage, tile split will be performed immediately. If not, just the mapping can be stored and a split will be decided based on the traffic statistic. Any tile splitting will affect only the future messages sent from the C-ITS AS. In any way, however, the vehicles should be aware of the tile split for which there are basically two methods to inform the vehicles:

Firstly, a broadcast can be employed to notify the split to the vehicles. This option will cause a peak in the signalling load, since a given number of terminals must be informed of the split at the same time or within a given (short) period of time. It may be useful to define a peak signalling load as a threshold, which is related to the network capacity in a certain area (e.g. 200 B/terminal). FIG. 4A shows such a scenario in terms of broadcast capacity (axis 803) versus time in seconds (axis 804).

Figure 4B:
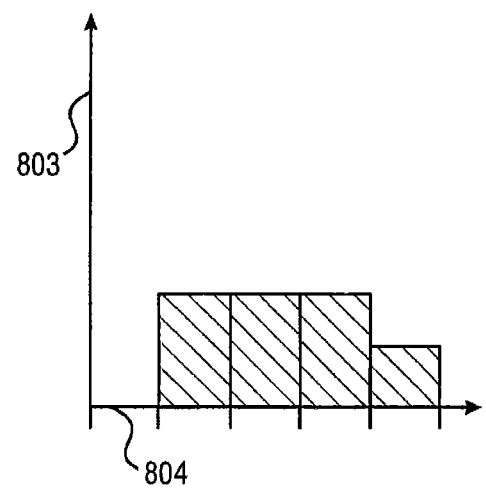

If the broadcast option causes a peak signalling load which is higher than the threshold value, the broadcast could be sent in waves or time slots as depicted in FIG. 4B. Such a procedure is able to flatten the peak signalling load. For related calculations one or more of the following parameters can be taken into account: maximum number of messages to be sent for broadcast; number of the targets in the certain tile; and number of waves/time slots.

For example, if the specified threshold for a peak load in one tile is 1000 clients in cell per second that can be reached, and there are 2500 clients in that tile, the following calculation can be carried out: (1) 20% safety margin from peak load: 80%*1000 clients in cell/second=800 clients in cell/second can be addressed; (2) there is a total 2 500 clients in the tile; and (3) 2 500/800=3.125 means that four waves or time slots are needed (in the first three waves 800 clients will be reached, and in the fourth wave the remaining 100 clients will be reached. As an example, one can consider Germany where there is an average vehicle density of 140 vehicles/ km², taken from 50 million vehicles and 375000 km². This would include, however, all vehicles and not only the ones on the road, but also the ones parked and currently unused.

The second option is to inform a vehicle when the new tile border is crossed (so-called "lazy split"). In this case, no broadcast message will be necessary, but, when a new vehicle crosses the border to the newly split tile, signalling exchange will occur between the GeoMessaging Enabler/Registry and the respective vehicle. Also this approach is able to flatten the signalling involved with the tile split.

Figure 5:
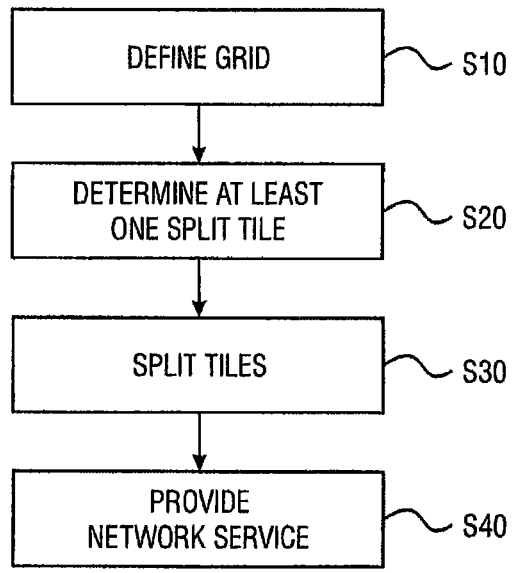
FIG. 5 shows a flowchart representation of method embodiments of the present invention.

FIG. 5 shows a flowchart representation of method embodiments of the present invention. This method embodiment is for providing a network service to a plurality of mobile terminals inside a service area, the mobile terminals being arranged to communicate with a cellular communication network and the service area being a part of a geographical area that is covered by the cellular communication network. The method comprises a step S10 of defining a grid with grid lines, wherein the grid covers the service area with one or more tiles framed by the grid lines. The method comprises a step S20 of determining whether there is at least one split tile that results from splitting the one or more tiles along closer grid lines and that does not overlap with the service area. The method comprises a step of S30 of splitting the one or more tiles along the closer grid lines based on the determining. The method also comprises a step S40 of providing the network service in the split tiles that cover the service area.

Figure 6:
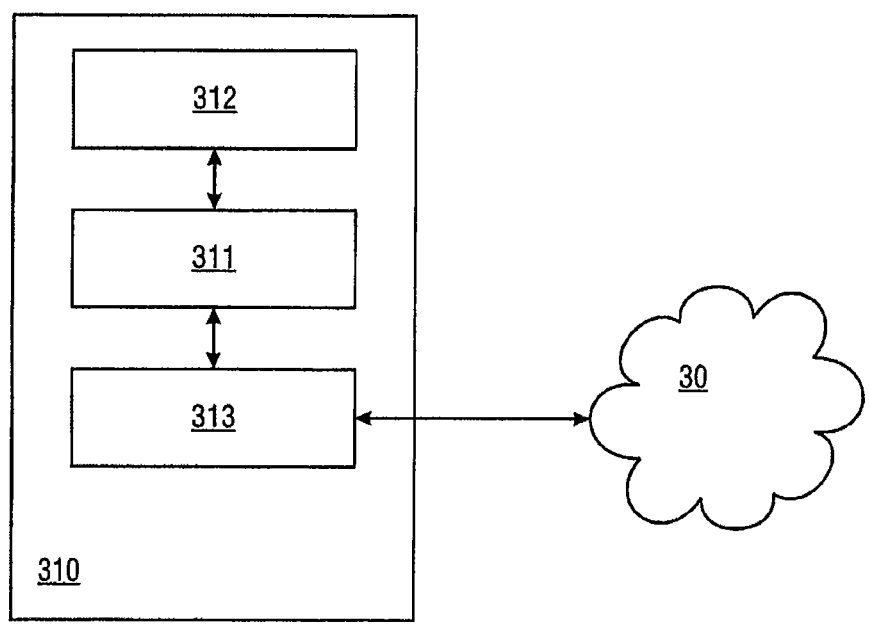
FIG. 6 shows a schematic view of a network entity in communication with a network according to another embodiment of the present invention.

FIG. 6 shows a schematic view of a network entity in communication with a network according to another embodiment of the present invention. In the sense of the present invention, an entity can be any of a dedicated piece of hardware, a share of hardware that is used by various processes and tasks, a collection of distributed pieces or shares of hardware. In this way, involved processing units and possibly also memory units can be dedicated, shared, or distributed.

According to this embodiment a network entity 310 is configured to provide a network service to a plurality of mobile terminals inside a service area, the mobile terminals being arranged to communicate with a cellular communication network and the service area being a part of a geographical area that is covered by the cellular communication network. The network entity 310 comprises a processing unit 311 that can execute code stored in a memory unit 312. In this way, the code may instruct the processing unit 311 to define a grid with grid lines, the grid covering the service area with one or more tiles framed by the grid lines, to determine whether there is at least one split tile that results from splitting the one or more tiles along closer grid lines and that does not overlap with the service area, to split the one or more tiles along the closer grid lines based on the determination whether there is at least one split tile, and to provide the network service in the split tiles that cover the service area. The network entity 310 may also comprise a communication unit 313 that is configured to communicate with a network system, such as the network 30 of the other embodiments of the present invention.

The embodiments of the present invention can provide several advantages over the conventional techniques. In particular, adapting the tile size to dynamic conditions can result in saving in total cost of ownership of the system/service in that less bandwidth will be needed. Further, statistical data can be collected that was not available before. Still further, a more precise geographical addressing and/or an easier addressing for the static SAs can be achieved.

Although detailed embodiments have been described, these only serve to provide a better understanding of the invention defined by the independent claims, and are not to be seen as limiting.

The invention claimed is:

1. A method for providing a network service to a plurality of mobile terminals inside a service area, the mobile terminals being arranged to communicate with a cellular communication network and the service area being a part of a geographical area that is covered by the cellular communication network, the method comprising the steps of:
    defining a grid with grid lines, the grid covering the service area with one or more tiles framed by the grid lines;
    determining whether there is at least one split tile that results from splitting the one or more tiles along closer grid lines and that does not overlap with the service area;
    splitting the one or more tiles along the closer grid lines based on the determining;
    providing the network service in the split tiles that cover the service area; and
    notifying mobile terminals of the split one or more tiles via a broadcast to the mobile terminals,
    wherein communication resources related to performing the broadcast are compared to a threshold, and wherein the broadcast is performed in waves of broadcasts or time slots when the threshold is exceeded.

2. The method of claim 1, further comprising:
    joining the split one or more tiles; and
    notifying mobile terminals of the split one or more tiles that have now been joined.

3. The method of claim 1, further comprising a step of estimating savings in communication resources, generated by splitting the one or more tiles along the closer grid lines, wherein the splitting is further based on a result of the estimating.

4. The method of claim 1, further comprising:
    determining the threshold based on a peak signalling load value defined for the service area.

5. The method of claim 4, wherein the threshold is determined based on a broadcast communication capacity in the service area.

6. The method of claim 1, wherein the notifying mobile terminals of the split one or more tiles via a broadcast to the mobile terminals, comprises:
    for each of the one or more tiles,
        determining a number of mobile terminals in the tile that are to receive the broadcast notification,
        determining a number of time slots to be used to broadcast the notification to the mobile terminals in the tile based on the determined number of mobile terminals in the tile, and
        selecting the time slots for use in the broadcast notification to the mobile terminals in the tile so that the broadcast notification is completed to the mobile terminals in the tile in the determined number of time slots.

7. The method of claim 1, wherein the notifying mobile terminals of the split one or more tiles via a broadcast to the mobile terminals, comprises:
    for each of the one or more tiles, determining a number of mobile terminals in the tile that are to receive the broadcast notification;
    determining a number of waves of broadcast notifications to be sent to corresponding different groups of the mobile terminals in the tiles based on the determined number of mobile terminals in the tiles; and sending waves of broadcast notifications to different groups of the mobile terminals in the tiles so that the broadcast notifications are completed to the mobile terminals in the determined number of waves.

8. The method of claim 1, wherein the service area is one of C-ITS application server service areas.

9. The method of claim 1, wherein the grid fields and the split grid fields are defined as grid fields of a geomessaging enabler.

10. A network entity for providing a network service to a plurality of mobile terminals inside a service area, the mobile terminals being arranged to communicate with a cellular communication network and the service area being a part of a geographical area that is covered by the cellular communication network, the network entity comprising:

at least one processor; and
at least one memory coupled to the at least one processor and which stores program code that when executed by the at least one processor causes the at least one processor to perform operations to:
define a grid with grid lines, the grid covering the service area with one or more tiles framed by the grid lines;
determine whether there is at least one split tile that results from splitting the one or more tiles along closer grid lines and that does not overlap with the service area;
split the one or more tiles along the closer grid lines based on the determination whether there is at least one split tile;
provide the network service in the split tiles that cover the service area; and
notify mobile terminals of the split one or more tiles via a broadcast to the mobile terminals,
wherein communication resources related to performing the broadcast are compared to a threshold, and wherein the broadcast is performed in waves of broadcasts or time slots when the threshold is exceeded.

11. The network entity of claim 10, wherein the at least one processor further performs operations to:
join the split one or more tiles; and
notify mobile terminals of the split one or more tiles that have now been joined.

12. The network entity of claim 10, wherein the at least one processor further performs operations to:
estimate savings in communication resources, generated by splitting the one or more tiles along the closer grid lines, wherein the splitting is further based on a result of the estimating.

13. The network entity of claim 10, wherein the at least one processor further performs operations to:
determine the threshold based on a peak signalling load value defined for the service area.

14. The network entity of claim 13, wherein the threshold is determined based on a broadcast communication capacity in the service area.

15. The network entity of claim 10, wherein the operation to notify mobile terminals of the split one or more tiles via a broadcast to the mobile terminals, comprises:
for each of the one or more tiles,
determining a number of mobile terminals in the tile that are to receive the broadcast notification,
determining a number of time slots to be used to broadcast the notification to the mobile terminals in the tile based on the determined number of mobile terminals in the tile, and
selecting the time slots for use in the broadcast notification to the mobile terminals in the tile so that the broadcast notification is completed to the mobile terminals in the tile in the determined number of time slots.

16. The network entity of claim 10, wherein the operation to notify mobile terminals of the split one or more tiles via a broadcast to the mobile terminals, comprises:
for each of the one or more tiles, determining a number of mobile terminals in the tile that are to receive the broadcast notification;
determining a number of waves of broadcast notifications to be sent to corresponding different groups of the mobile terminals in the tiles based on the determined number of mobile terminals in the tiles; and
sending waves of broadcast notifications to different groups of the mobile terminals in the tiles so that the broadcast notifications are completed to the mobile terminals in the determined number of waves.

17. The network entity of claim 10, wherein the service area is one of C-ITS application server service areas.

18. The network entity of claim 10, wherein the grid fields and the split grid fields are defined as grid fields of a geomessaging enabler.

19. A computer program product for providing a network service to a plurality of mobile terminals inside a service area, the mobile terminals being arranged to communicate with a cellular communication network and the service area being a part of a geographical area that is covered by the cellular communication network, the computer program product comprising a non-transitory computer readable medium storing program code, the program code, when executed by at least one processor causes the at least one processor to perform operations comprising:

defining a grid with grid lines, the grid covering the service area with one or more tiles framed by the grid lines;
determining whether there is at least one split tile that results from splitting the one or more tiles along closer grid lines and that does not overlap with the service area;
splitting the one or more tiles along the closer grid lines based on the determining;
providing the network service in the split tiles that cover the service area; and
notifying mobile terminals of the split one or more tiles via a broadcast to the mobile terminals,
wherein communication resources related to performing the broadcast are compared to a threshold, and wherein the broadcast is performed in waves of broadcasts or time slots when the threshold is exceeded.

20. The computer program product of claim 19, wherein the operations further comprise:
joining the split one or more tiles; and
notifying mobile terminals of the split one or more tiles that have now been joined.

* * * * *